(12) United States Patent
Jausovec et al.

(10) Patent No.: US 10,683,771 B2
(45) Date of Patent: Jun. 16, 2020

(54) MEASURING DEVICE FOR MEASURING AERODYNAMIC FLOW PARAMETERS OF A TURBOMACHINE VANE, VANE AND PART OF TURBOMACHINE EQUIPPED WITH SAID MEASURING DEVICE

(71) Applicant: SAFRAN AIRCRAFT ENGINES, Paris (FR)

(72) Inventors: Antoine Jean Jausovec, Tournan-en-Brie (FR); Eric Roger Schwartz, Seine-Port (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 69 days.

(21) Appl. No.: 15/988,982

(22) Filed: May 24, 2018

(65) Prior Publication Data

US 2018/0340444 A1 Nov. 29, 2018

(30) Foreign Application Priority Data

May 26, 2017 (FR) ..................... 17 54663

(51) Int. Cl.
*F01D 21/00* (2006.01)
*F01D 9/04* (2006.01)
*F01D 17/08* (2006.01)

(52) U.S. Cl.
CPC ........... *F01D 21/003* (2013.01); *F01D 9/041* (2013.01); *F01D 17/08* (2013.01);
(Continued)

(58) Field of Classification Search
CPC ........ F01D 21/003; F01D 9/041; F01D 17/08; F05D 2220/32; F05D 2240/128;
(Continued)

(56) References Cited

U.S. PATENT DOCUMENTS

| 2,946,221 | A | * | 7/1960 | Annear | ................. F01D 21/003 |
| | | | | | 73/861.65 |
| 4,433,584 | A | * | 2/1984 | Kokoszka | ............... G01P 5/175 |
| | | | | | 73/861.66 |
| 4,605,315 | A | * | 8/1986 | Kokoszka | ............... G01K 13/02 |
| | | | | | 374/138 |
| 4,765,751 | A | * | 8/1988 | Pannone | ................. F01D 17/02 |
| | | | | | 374/135 |

(Continued)

FOREIGN PATENT DOCUMENTS

| FR | 3012169 A1 | 4/2015 |
| GB | 2111221 A | 6/1983 |
| WO | 2016/174412 A1 | 11/2016 |

OTHER PUBLICATIONS

Rapport de Recherche Préliminaire / Opinion Écrite sur la Brevetabilité de l'Invention, dated Jan. 10, 2018, issued in corresponding French Application No. 1754663, filed May 26, 2017, 7 pages.

*Primary Examiner* — J. Todd Newton
(74) *Attorney, Agent, or Firm* — Christensen O'Connor Johnson Kindness PLLC

(57) ABSTRACT

A device that measures turbomachine aerodynamic flow parameters is presented. The device includes the information collection elements relating to the flow parameters, and a body that includes the information collection elements. The body features a portion that is elongated in the longitudinal direction and configured to form the leading edge of a turbomachine vane, and a first side portion that laterally extends portion in an axial direction, wherein the information collection elements protrude from the leading edge of the portion and the portion includes internal channels that route the information and individually communicate with at least one information collection elements, wherein the first (Continued)

side portion features a first surface configured to fit, at least partially, onto a second surface of an intrados or extrados wall of a turbomachine vane.

10 Claims, 2 Drawing Sheets

(52) U.S. Cl.
CPC .... *F05D 2220/32* (2013.01); *F05D 2230/237* (2013.01); *F05D 2240/121* (2013.01); *F05D 2240/128* (2013.01); *F05D 2240/55* (2013.01); *F05D 2260/20* (2013.01); *F05D 2260/83* (2013.01)

(58) Field of Classification Search
CPC ............. F05D 2240/55; F05D 2260/20; F05D 2260/831111; F05D 2240/121; G01P 5/165; G01P 5/14
USPC ................................ 415/118; 73/861.66, 431
See application file for complete search history.

(56) References Cited

U.S. PATENT DOCUMENTS

| | | | | |
|---|---|---|---|---|
| 9,297,720 | B2* | 3/2016 | Agoos | G01M 15/14 |
| 9,856,743 | B2* | 1/2018 | Kockenpo | F01D 17/08 |
| 10,520,524 | B1* | 12/2019 | Griffin | B64C 13/18 |
| 2008/0025839 | A1* | 1/2008 | Schilling | F01D 17/162 |
| | | | | 416/61 |
| 2009/0031801 | A1* | 2/2009 | Martindale | F01D 21/003 |
| | | | | 73/431 |
| 2014/0182292 | A1* | 7/2014 | Hudon | F01D 21/003 |
| | | | | 60/722 |
| 2015/0110602 | A1* | 4/2015 | Radeljak | F01D 17/02 |
| | | | | 415/118 |
| 2015/0226082 | A1* | 8/2015 | Radeljak | F01D 21/003 |
| | | | | 415/118 |
| 2016/0348531 | A1* | 12/2016 | Rice | F01D 17/08 |
| 2016/0356175 | A1* | 12/2016 | Waddington | G01P 5/06 |
| 2017/0138216 | A1* | 5/2017 | Giordan | G01P 5/14 |
| 2018/0111332 | A1* | 4/2018 | Collis | B29C 66/301 |

* cited by examiner

MEASURING DEVICE FOR MEASURING AERODYNAMIC FLOW PARAMETERS OF A TURBOMACHINE VANE, VANE AND PART OF TURBOMACHINE EQUIPPED WITH SAID MEASURING DEVICE

FIELD OF THE DISCLOSURE

Embodiments of this disclosure relate to the field of measuring devices used to measure aerodynamic flow parameters, and in particular the aerodynamic flow of turbomachine. They pertain to a measuring device designed to collect information on flow parameters upstream from a turbomachine blade. They also pertain to a turbomachine blade and to a turbomachine part equipped with the measuring device.

BACKGROUND

Turbomachine, and in particular that of an aircraft, includes at least one annular flow path extending longitudinally in which an aerodynamic air flow can circulate. The air flow travels upstream to downstream and passes, in succession, through a compressor unit, a combustion chamber and the turbomachine turbine unit. The terms "upstream" and "downstream" are defined in relation to the direction in which gases travel through the turbomachine. The compressor unit includes one or several compressor stages, and the turbine unit includes one or several turbine stages. The compressor and turbine stages each feature several rows of stationary blades and rotating blades. Stationary blades, also known as distributors or rectifiers, direct the air flow towards the rotating blades. The rotating blades exchange the flow energy with a rotating shaft coaxial to the longitudinal axis. Each blade features a vane that extends radially from a head end to a foot end, and that includes an upstream leading edge, and a downstream trailing edge. Opposite intrados and extrados surfaces extend between the leading and trailing edges.

Turbomachine undergoes multiple tests and trials designed, on one hand, to validate and check its proper functioning and, on the other, its capacity to maintain its integrity and performance level. During these tests and trials, a measuring device is used to measure specific aerodynamic flow parameters, such as pressure and/or temperature and/or gyration. The airflow features different characteristics in different areas of the flow path, for example in the central area of the flow path and along the walls of the flow path. There are several types of measuring devices designed to measure one or several flow parameters. These measuring devices are generally known as measuring combs. However, the implementation of traditional and intrusive measuring devices entails integration constraints owing to the size and mechanical strength of certain turbomachine parts, excessive perturbation and the aerodynamic function of the instrumented part, or to excessive mechanical stress on the measuring device.

With regard to the measuring of flow parameters in the turbomachine blade vanes environment, it is customary to equip the leading edge of the vanes with information collection elements that are attached or brazed in a similarly-shaped orifice located on the leading edge of the vane. The information collection elements are connected to routing elements of the collected information, which is routed in or through the vane. Such an instrumented vane is described in document FR3012169. However, this solution requires in-depth modifications of the vane. In particular, in the case of a cooled vane and/or a vane designed to circulate cooling air to other components, the information transfer elements disrupts the cooling of the vane walls by forcing the modification or the removal of sleeves and/or the cooling air path by obstructing the air routing circuit. Furthermore, this solution is complex, costly and hard to reconcile with engine development schedules.

SUMMARY

According to embodiments of the disclosure, a measuring device is provided for measuring turbomachine aerodynamic flow parameters, whereby the device includes information collecting elements to collect information relating to the flow parameters, and a body that includes the information collection elements, and whereby the body comprising a long portion that extends longitudinally and that is configured to form the leading edge of a turbomachine vane, and a first side portion that laterally extends the portion in an axial direction, and where the information collection elements protrudes from the leading edge of the portion, and where the portion includes internal information transfer channels, each of which communicates with at least one information collection elements, and whereby the first side portion comprising a first surface configured to partially fit with a second surface of an intrados or extrados wall of a turbomachine vane.

A configuration according to these aforementioned embodiments provide, among other things, a measuring device that is quick to implement, and that facilitates the machining of the vane and the part supporting the vane, on which the device is to be installed. It is possible to arrange several information collection elements along the leading edge without impacting the profile of the vane. Furthermore, the impact on the ventilation function of the blade is limited, owing to the fact that the routing elements do not pass through the blade vane on which the device is installed, but only through the device.

According to one embodiment, the body of the measuring device is designed to fit onto the leading edge of the vane.

In one embodiment, the body includes a second side portion that extends the portion laterally in an axial direction and that faces the first side portion, whereby the second side portion features a first surface configured to fit with at least partially a second surface of the other of the intrados and extrados walls of the turbomachine blade. This configuration is designed to follow the profiles of the vane's extrados and intrados walls, and to generate a progressive transition from the device to the walls, which has the effect of limiting the aerodynamic impact of the device.

According to another feature, the measuring device includes information routing elements, each of which communicates with internal channels, whereby the routing elements extend out of the measuring device in a substantially longitudinal direction. This configuration allows for the transfer of flow parameters recorded outside the vane, specifically towards an information processing system.

According to another feature, each information collection elements extends from the leading edge at a predetermined angled and radial position, whereby the measuring is performed according to the quality requirements specific to the measured parameter.

According to another feature, the measuring device forms a single part.

Advantageously, but without limitation, an additive manufacturing process is implemented to construct the measuring device. This process facilitates the manufacturing of the device.

According to another feature, the information collection elements include nozzles configured to perform measurements upstream from the leading edge.

Advantageously, but without limitation, the measuring device in some embodiments is constructed with a metallic material or with an alloy based on a metallic material. The measuring device can also be made of a ceramic material or of a composite material with a ceramic matrix. These materials can withstand the high temperatures of the environment in which the measuring device is used. These materials are also suited to the attachment elements that are used to secure the device to the vane of the blade.

Embodiments of the disclosure also relate to a turbomachine vane fitted with a measuring device that features any of the aforementioned characteristics, whereby the vane includes an extrados wall and an intrados wall that extend axially and that are interconnected, in the downstream portion at least, by a trailing edge that follows the direction of flow through the turbomachine, and whereby the measuring device is installed on the vane with the device portion located upstream from the trailing edge.

In one embodiment, at least the first surface of the first or second side portion of the device is in contact with the second surface of the corresponding intrados or extrados wall, whereby the second surface defines the external surface and the first side portion is overlapping in a direction that is substantially transversal to the intrados or extrados wall.

In another embodiment, each first and second side portion includes a first surface in contact with a second surface of the intrados or extrados wall, the first and second surfaces being defined in planes that are parallel to one another and substantially perpendicular to the axial direction.

In another embodiment, the first surface of each first and second side portion is welded or brazed to the second surface of each intrados and extrados wall, so as to create an aerodynamic vane profile.

Embodiments of the disclosure also pertain to a turbomachine part equipped with at least one turbomachine blade featuring any of the aforementioned characteristics, whereby the part includes a wall sector that is radially internal and a wall sector that is radially external, between which the blade extends, and whereby the radially external wall sector includes passage holes through the wall of the radially external wall sector, and through which the routing elements of the measuring device passes.

According to another feature of the turbomachine part, a sealing means, sealing structure, etc., is arranged between each passage hole and routing elements. In some embodiments, but without limitation, the sealing means or sealing structure contains refractory cement.

Embodiments of the disclosure also pertain to a turbomachine that includes at least one turbomachine part or at least one turbomachine blade according to the previous claim.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
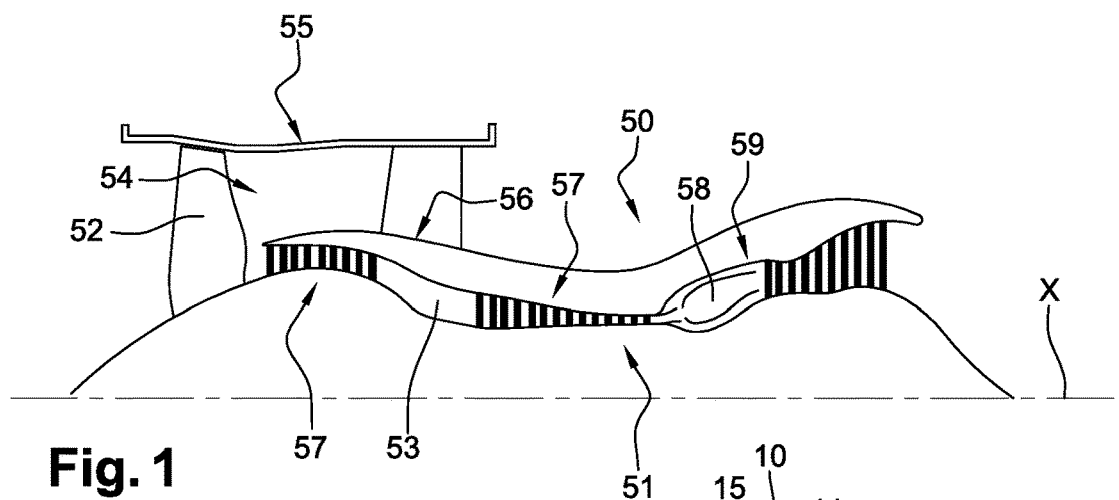
FIG. 1 is a schematic partial view of an axial section of an example of double-flow turbomachine to which the disclosure applies.

FIG. 1 shows a partial and cross section view of turbomachine along the longitudinal axis X, in particular of double-flow turbomachine according to the disclosure. Naturally, embodiments of the disclosure are not limited to this type of turbomachine.

This double-flow turbomachine 50 generally includes a gas generator 51, upstream of which a fan 52 is installed. In this disclosure and more generally, the terms "upstream" and "downstream" are defined in relation to the direction in which gases travel through the turbomachine. Turbomachine 50 includes a primary flow path 53 in which a primary flow or a flow of hot air can circulate and pass through the gas generator 51 and a secondary flow path 54, in which a secondary flow or a flow of cold air circulates around the gas generator 51. The primary and secondary flow paths are arranged coaxially. In some embodiments, the secondary flow path 54 is limited radially by a fan casing 55 and an internal casing that houses the gas generator 51. The term "radial" is defined in relation to an axis that runs substantially perpendicular to the longitudinal axis X. The gas generator 51 includes, from upstream to downstream, a compressor unit 57, a combustion chamber 58, and a turbine unit 59. The latter items form the gas generator 51. The compressor unit 57 includes one or several compressor stages, and the turbine unit 59 includes one or several turbine stages. Unless otherwise understood from the context of the disclosure, the term "substantially" when describing direction or orientation with respect to another element means any angle up to and including plus or minus 45 degrees.

The compressor and turbine stages include several annular rows of blades arranged circumferentially around axis X of the turbomachine. The blades extend radially through the primary flow path 53 in which the primary flow circulates.

Figure 2:
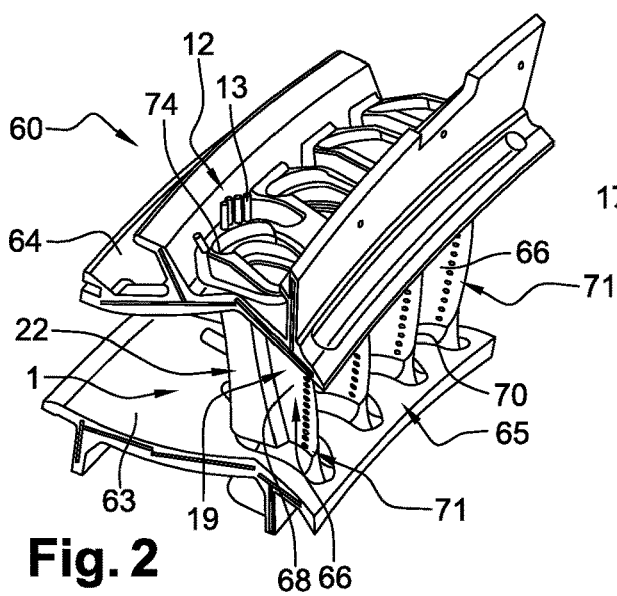
FIG. 2 is a perspective view of a turbomachine part equipped with an embodiment of the measuring device.
Figure 7:
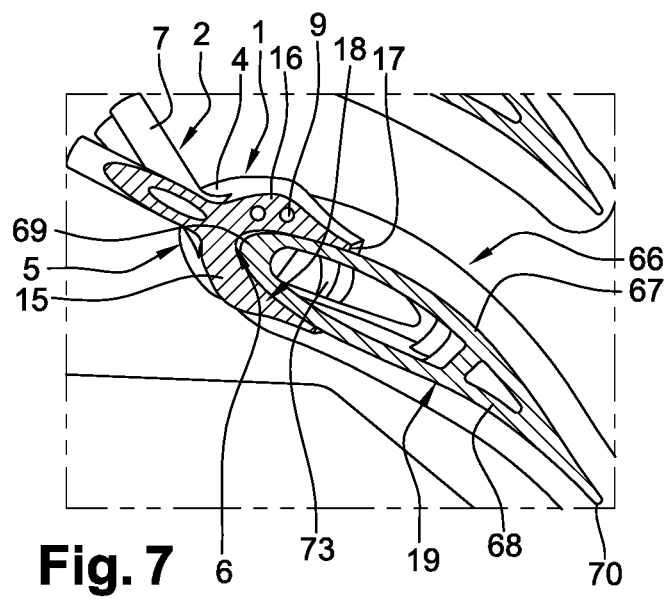
FIGS. 7 to 9 each represent another embodiment of the measuring device according to the disclosure.

FIG. 2 shows a turbomachine part, such as a of a guide vane sector 60, with a radially internal wall sector 63 and a radially external wall sector 64. In this example, four blades 65 link the radially internal and external wall sectors 63, 64. Each blade 65 features a vane 66 that has an extrados wall 67 (see FIG. 5) and an intrados wall 68, both of which extend axially and are interconnected upstream by a leading edge 69 (see FIG. 5) and downstream by a trailing edge 70, following the direction of flow through the turbomachine. As these blades 65 work with the primary flow, a cavity 73, as shown in FIG. 7, can be created between the intrados and extrados walls 67, 68 so as to provide for the cooling of vane 66. Naturally, vane 66 can feature other cavities or none at all. To cool a vane with cavities, several holes 71 run transversally through the intrados and extrados walls 67, 68 and connect with the cavity 73 of vane 66.

One of the vanes 66 of the guide vane sector 60 is fitted with a measuring device 1 that measures the aerodynamic flow parameters. The latter device is installed, at least partially, in the flow that circulates through the turbomachine, where it maps the pressures and/or temperatures and/or gyrations of the flow. In this case, the purpose is to measure at least the pressure and/or the temperature and/or other flow parameters in an area of the primary flow path of the turbine unit 59. Broadly speaking, this measuring device 1 features at least the profile of the leading edge 69 of the blade and is separate from vane 66. The measuring device 1 is located upstream from the leading edge 69 of the vane. In some embodiments, the measuring device 1 is configured to form the leading edge of the vane.

Figure 3:
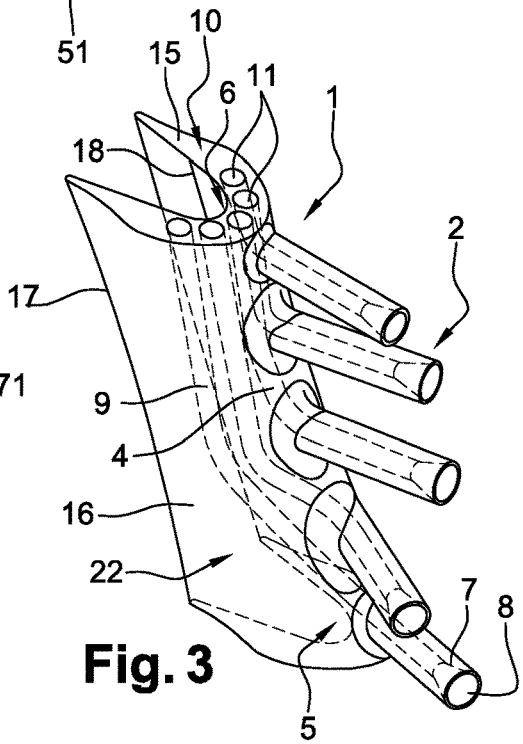
FIG. 3 is a perspective view of an embodiment of the measuring device designed to equip a turbomachine vane.
Figure 4:
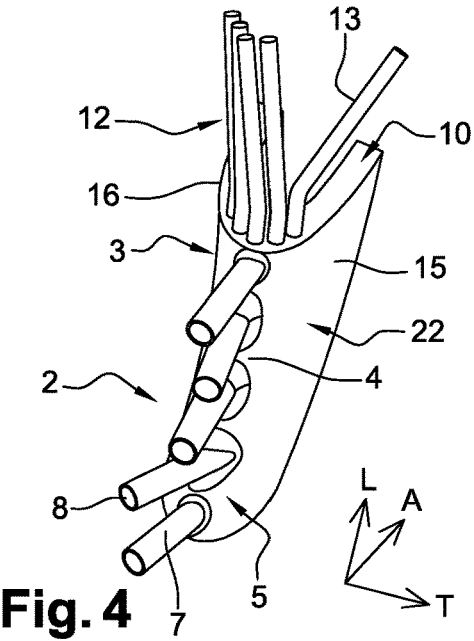
FIG. 4 is a perspective view of the measuring device of FIG. 3 equipped with the routing elements to transfer collected information.

In reference to FIGS. 3 and 4, the measuring device 1 includes the information collection elements 2 which collect information relating to the measured flow parameters, and a body 3 that includes the information collection elements 2. Body 3 extends in a longitudinal direction L that runs roughly parallel to the radial axis of the turbomachine when the device is installed in the turbomachine, and features a curvilinear cross section along a plane that is perpendicular to longitudinal direction L. Body 3 features an elongated portion 4 following longitudinal direction L and forms a leading edge. This portion 4 is designed to fit onto the leading edge 69 of the vane 66 (see FIG. 7) or to form the leading edge 69 of vane 66 (see FIG. 10). For this purpose, portion 4 includes an external surface 5 that faces the aerodynamic flow (the flow follows axial direction A, which is perpendicular to longitudinal direction L and parallel to axis X) and an opposite internal surface 6 that follows axial direction A. FIG. 4 also shows a transversal direction T, which is perpendicular to longitudinal direction L and axial direction A. External surface 5 and internal surface 6 are substantially convex in the axial direction A. With this configuration, portion 4 of device 1 can fit onto the leading edge 69 of vane 66. In some embodiments, this configuration reduces the aerodynamic losses introduced in the flow when the measuring device is installed on vane 66.

The leading edge formed by portion 4 includes the information collection elements 2 that protrude from the leading edge. The information collection elements 2 extend from the internal surface 5 following axial direction A. In some embodiments, to meet specific measuring requirements (e.g., positioning the measuring nozzle towards the air flow to prevent incidence effects on the probe that are detrimental to the quality of the measuring, etc.), each information collection elements 2 follows a predetermined angular orientation and radial position. In the example shown on FIGS. 3 and 4, five information collection elements 2 are arranged at regular intervals along the leading edge of portion 4 at different orientations. The orientation angle of each information collection means ranges from −45° to +45° in relation to longitudinal direction L and is different for each information collection elements 2. Information collection elements 2 include nozzles 7 that each features a straight and substantially cylindrical body. The body also features an inlet 8 facing the flow, to collect a sample upstream from the leading edge, and an outlet (not shown) that is axially opposite. These nozzles 7 provide for the collection of temperature and/or pressure information. In this example, the nozzles measure the pressure of the flow upstream from the vane in various turbomachine operating conditions, and are generally known as Pitot tubes or Kiel probes.

Portion 4 includes internal channels 9 that route the information collected by information collection elements 2. Internal channels 9 extend in the wall of the device, for example in portion 4, as shown with dotted lines in FIG. 3. Internal channels 9 are evenly spaced in the wall and follow the profile of portion 4. Each of these internal channels 9 each leads to a radially external surface 10 of portion 4 through an aperture 11. The radially external surface 10 is defined on a plane that is substantially perpendicular to longitudinal direction L. Apertures 11 are distributed along the radially external surface 10. Furthermore, internal channels 9 communicate with information collection elements 2, for example with their outlets. Each internal channel 9 communicates with the outlet of a nozzle 7. Here, five apertures 11 communicate with an internal channel 9, which is connected to a nozzle 7 for the circulation of the flow within the device. As shown in FIG. 3, each internal channel 9 features a substantially rectilinear portion following longitudinal direction L, extending from corresponding aperture 11, and a substantially transversal portion that connects to a nozzle.

Figure 5:
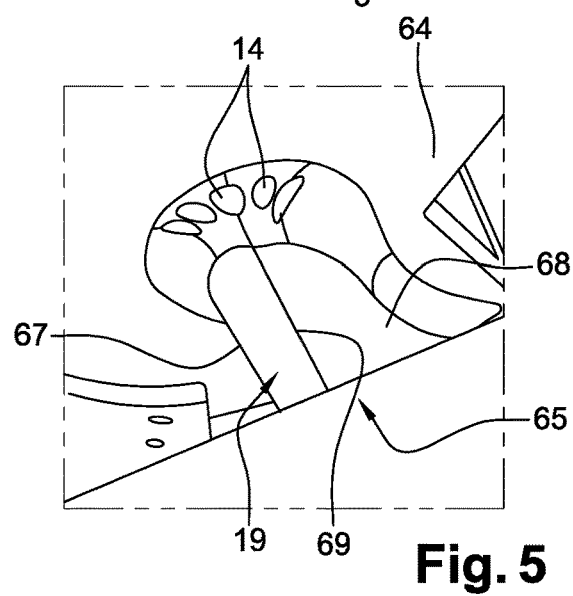
FIG. 5 is a bottom and perspective view of a radially external wall section of a turbomachine part that supports vanes.
Figure 6:
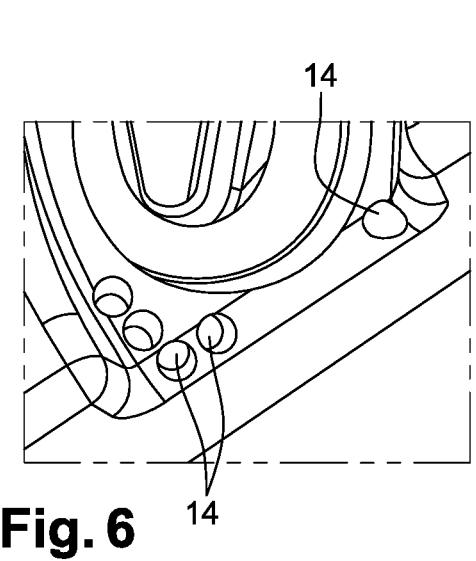
FIG. 6 is a top and perspective view of the radially external wall of the turbomachine part.

In reference to FIGS. 4 and 5, device 1 includes an information routing elements 12 located outside device 1. The routing elements 12 is in the form of ducts 13 that transmit the collected information, in this case by nozzles 7, to an information processing system, such as a calculator or a sensor. For this purpose, the radially external wall sector includes, at the level of a platform 74 passage holes 14 that run through the wall on either side of the radial axis of the turbomachine. Each duct 13 connects to an internal channel 9 and extends radially and longitudinally out of the body of measuring device 1, so as to pass through a passage hole 14 in the radially external wall sector 64. Ducts 13 can feature varying orientations and pass through the wall at different locations, as shown in FIG. 2. The passage holes 14 feature sealing means to prevent aerodynamic losses. As an example of sealing means, a coat of refractory cement is applied between each passage hole 14 and a duct 13. Furthermore, in FIGS. 2 to 4 and 7, the measuring device 1 includes a first side portion 15 and a second side portion 6 that axially extend the portion 4 of the measuring device 1. In the axial direction, these first and second side portions 15, 16 are arranged on either side of portion 4 and face one another. The first and second side portions 15, 16 share similar profiles or a profile that is substantially identical to the intrados and extrados walls 67, 68 of vane 66. In this example, the thickness of each first and second side portion 15, 16 becomes thinner from upstream to downstream until it forms a trailing edge 17. More specifically, the side portions feature an external continuous surface 22 flush with external surface 5 of portion 4.

Each first and second side portion 15, 16 includes a first surface that is configured to fit, at least partially, onto a second surface of an intrados or extrados wall of vane 66. In some embodiments, the first and second side portions 15, 16 each feature a contact internal surface 18 designed to come into contact, respectively, with at least one external surface 19 of the intrados and extrados walls 67, 68 of a vane 66. The internal surface 18 of the first side portion 15 is defined in a plane that is substantially parallel to that of the external surface 19 of the intrados wall 68 of vane 66. The internal surface 18 is transversally opposite external surface 22. More specifically, along axial direction A, internal surface 18 of the first side portion 15 is convex so as to fit onto the convex shape of the external surface 19 of the intrados wall 68. Similarly, the internal surface 18 of the second side portion 16 is defined in a plane that is parallel to that of the external surface 19 of the extrados wall. Internal surface 18 defines the first surface of the device, whereas external surface 19 defines the second surface of vane 66. As shown on FIG. 7, the device 1 is installed upstream from the leading edge 69 of vane 66. The transversal section of the device is substantially U-shaped, and the information collection elements 2 protrudes from the base of the U. The flow through the turbomachine pushes the device down on the vane, thereby ensuring that it is firmly secured to the vane. The measuring device can also be secured to the leading edge of the blade by welding, brazing, or any other suitable elements. The side portions 15, 16 do not obstruct the holes 71 that provide for the cooling of vane 66 through the cavity or cavities 73.

Figures 8, 9:
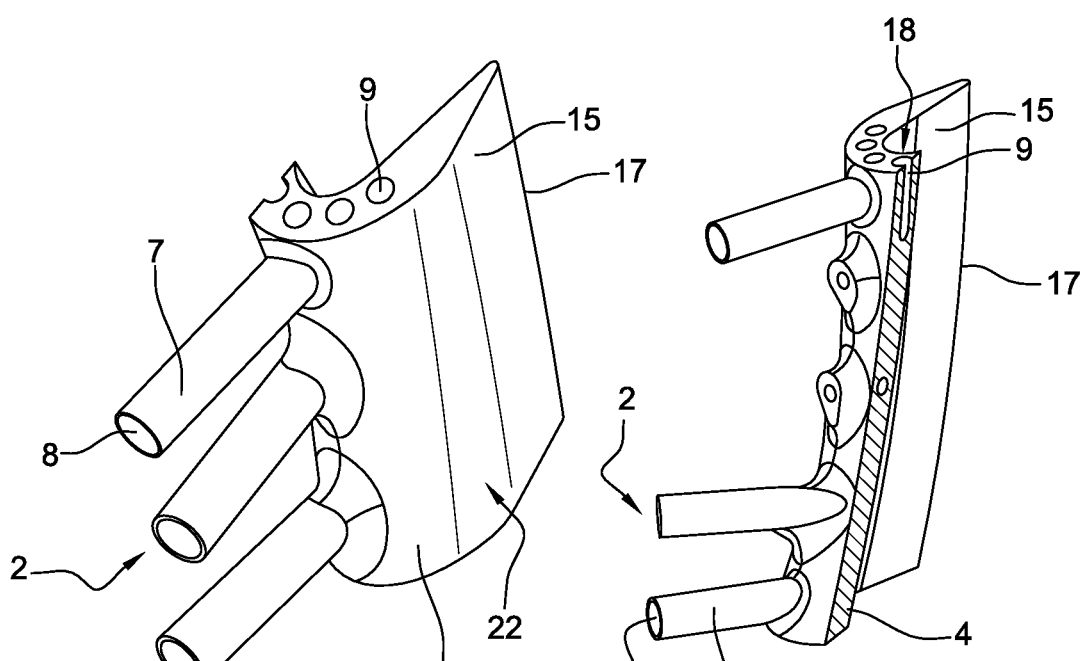

In another embodiment shown in FIGS. 8 and 9, measuring device 1 features a body that includes a portion 4 shoe on the leading edge of vane 66, and a single side portion that extends portion 4 in an axial direction. This side portion fits on the external surface of the extrados or intrados wall 67, 68 of a vane 66. This configuration satisfies certain aerodynamic specifications by adapting the geometrical features of the measuring device to the intrados or extrados wall of the vane. This measuring device also includes nozzles 7 that extend from the leading edge formed by portion 4.

Figure 10:
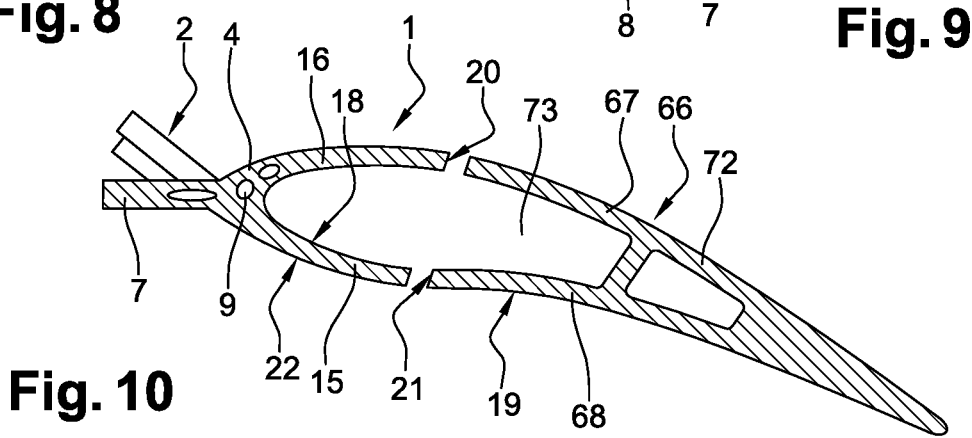
FIG. 10 is a cross section and schematic view of another embodiment of the measuring device mounted on a portion of the turbomachine vane.

In another embodiment shown in FIG. 10, measuring device 1 is secured to a vane portion 72, thereby forming the vane 66. An upstream vane portion 66 is indeed cut, and the device 1 is secured upstream to this vane portion 66. This measuring device substantially features the same characteristics and configurations as that of the device according to the first embodiment described above. Previously-described and identical items have the same numerical references in the following description. Specifically, measuring device 1 includes a portion 4 that forms the leading edge, upstream from trailing edge of vane 66, and the first and second side portions 15, 16 axially extend portion 4. Each first and second side portion 15, 16 includes a contact surface 20 that is in contact with a transversal surface 21 of the intrados and extrados walls 67, 68. External surfaces 22 of the first and second side portions are flush with external surface 19 of the portions of intrados and extrados walls 67, 68, so as to maintain the aerodynamic profile of vane 66. In other words, each external surface 22 of device 1 creates a surface continuity with, respectively, the external surfaces 19 of the vane portion 72. The contact surface 20 defines the first surface, whereas transversal surface 21 defines the second surface of vane 66. The contact surfaces 20 and the transversal surfaces 21 are defined in planes that are substantially parallel to each other and perpendicular to longitudinal direction L. They form a support-plane connection. Contact surfaces 20 and transversal surfaces 21 are attached to each other by welding or brazing, or by any other suitable elements. The nozzles 7 extend from portion 4, thereby forming the leading edge of vane 66. This configuration defines a geometry that is similar to that of vane 66 and reduces aerodynamic disturbances. All the instrumentation is included in measuring device 1, which is attached to the portion of vane 66.

In some embodiments, but without limitation, the measuring device is made of a metallic material or an alloy based on a metallic material, or of a ceramic material or a composite material with a ceramic matrix. An example of metallic material or an alloy based on a metallic material that can be employed is an Inconel 600® or a René 77®. Inconel 600® is a Nickel-based alloy that ensures good temperature-related performance and mechanical properties. With regard to the ceramic material or the composite with a ceramic matrix, aluminium oxide (Al2O3) or zirconium dioxide (Zr02) or a mixture of at least one of these two compounds can be used. These materials also provide good temperature-related performance and mechanical properties.

The measuring device forms a single part. In other words, the information collection elements 2, the routing elements 12, the internal channels 9, and the side portion(s) 15, 16 are constructed, in some embodiments but without limitation, in a single part that includes the body of the device.

The body of the device in some embodiments is constructed using an additive manufacturing process. In some embodiments, but without limitation, the additive manufacturing process can be a process of Selective Laser Melting, a technique whereby powdered material is melted to create the device.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A device for the measuring of turbomachine aerodynamic flow parameters, whereby the device includes:
   information collection elements relating to flow parameters; and
   a body that includes said information collection elements, wherein the body includes a body portion that is elongated in a longitudinal direction and configured to form a leading edge of a turbomachine vane, and a first side portion that laterally extends the body portion in an axial direction, said information collection elements protruding from the leading edge of said body portion and said body portion including internal channels that route information and individually communicate with at least one information collection elements, wherein the first side portion includes a first surface configured to fit, at least partially, onto a second surface of an intrados wall or an extrados wall of the turbomachine vane.

2. The device according to claim 1, wherein the body includes a second side portion that extends the body portion laterally in the axial direction and that faces the first side portion, wherein the second side portion features a first surface configured to fit with at least partially a second surface of the other of the intrados and extrados walls of the vane.

3. The device according to claim 1, further comprising information routing elements, each of which communicates with said internal channels, wherein the routing elements extend out of the measuring device in a substantially longitudinal direction.

4. The device according to claim 1, wherein the device is made as a single part.

5. A turbomachine vane fitted with a measuring device according to the device of claim 1, wherein the extrados wall and the intrados wall extend axially and are interconnected, in the downstream portion at least, by a trailing edge that follows the direction of flow through the turbomachine, and wherein the measuring device is installed on the turbomachine vane with the device portion located upstream from the trailing edge.

6. The vane according to claim 5, wherein at least the first surface of the first side portion or a second side portion of the device is in contact with the second surface of the corresponding intrados or extrados wall, and wherein the second surface defines the external surface and the first side portion is overlapping in a direction that is substantially transversal to the intrados or extrados wall.

7. The vane according to claim 5, wherein each first and second side portion includes a first surface in contact with a second surface of the intrados or extrados wall, wherein the first and second surfaces are defined in planes that are parallel to one another and substantially perpendicular to the axial direction.

8. The vane according to claim 7, wherein the first surface of each first and second side portion is welded or brazed to the second surface of each intrados and extrados wall, so as to create an aerodynamic vane profile.

9. A turbomachine part comprising at least one turbomachine vane according to claim 5, wherein the part includes a radially internal wall sector and a radially external wall sector, between which the vane extends, and wherein the radially external wall sector includes passage holes through the wall of the radially external wall sector, and through which the routing elements of the measuring device passes, said measuring device being installed on the turbomachine vane with the body portion located upstream from the trailing edge of the turbomachine vane.

10. The turbomachine part according to claim 9, wherein one or more seals are arranged between each passage hole and routing elements.

* * * * *